United States Patent
Wu et al.

(10) Patent No.: US 9,657,670 B2
(45) Date of Patent: May 23, 2017

(54) EXHAUST SYSTEM TEMPERATURE ESTIMATION SYSTEMS AND METHODS

(71) Applicant: GM Global Technology Operations LLC, Detroit, MI (US)

(72) Inventors: Zhijian James Wu, Rochester Hills, MI (US); Sanjeev M. Naik, Troy, MI (US); Joshua D. Cowgill, Hartland, MI (US); Martino Casetti, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 14/873,510

(22) Filed: Oct. 2, 2015

(65) Prior Publication Data

US 2017/0096957 A1 Apr. 6, 2017

(51) Int. Cl.
| | | |
|---|---|---|
| *F02D 41/14* | (2006.01) | |
| *G01M 15/10* | (2006.01) | |
| *G01K 13/02* | (2006.01) | |
| *F02D 41/26* | (2006.01) | |
| *F02D 41/00* | (2006.01) | |

(Continued)

(52) U.S. Cl.
CPC ............ *F02D 41/1447* (2013.01); *F01L 1/34* (2013.01); *F02B 37/186* (2013.01); *F02D 41/0002* (2013.01); *F02D 41/0077* (2013.01); *F02D 41/26* (2013.01); *F02D 41/3005* (2013.01); *F02P 5/15* (2013.01); *G01K 13/02* (2013.01);

(Continued)

(58) Field of Classification Search
CPC .. F02D 41/0002; F02D 41/0077; F02D 41/05; F02D 41/14; F02D 41/1447; F02D 41/26; F02D 41/30; F02B 37/186; F02P 5/15; G01M 15/102; G01K 13/02; G01K 2013/024; F01L 1/34
USPC ........ 701/103, 106, 107, 114; 123/676, 678, 123/686, 689, 435, 568.22
See application file for complete search history.

(56) References Cited

U.S. PATENT DOCUMENTS 5,682,317 A 10/1997 Keeler et al.
5,755,212 A 5/1998 Ajima
(Continued)

OTHER PUBLICATIONS

Samokhim, Sergey, Zenger, Kai; "Robust and Adaptive Wastegate Control of Turbocharged Internal Comubstion Engines", 2014 American Control Conferences (ACC); Portland, Oregon, Jun. 4-6, 2014; pp. 3219-3224.

(Continued)

*Primary Examiner* — John Kwon
*Assistant Examiner* — Johnny H Hoang

(57) ABSTRACT

A control system for an engine of a vehicle includes an adder module that determines a temperature sum based on a sum of a plurality of temperatures determined based on (i) a plurality of operating parameters of the vehicle and (ii) a plurality of predetermined values calibrated for determining an estimated temperature at a location within an exhaust system of the vehicle. A temperature difference module determines a temperature difference based on the temperature sum and a previous value of the temperature difference. An estimating module determines the estimated temperature at the location within the exhaust system based on the temperature difference and a reference temperature. An actuator control module selectively adjusts at least one engine actuator based on the estimated temperature.

20 Claims, 7 Drawing Sheets

(51) Int. Cl.
- *F02D 41/30* (2006.01)
- *F01L 1/34* (2006.01)
- *F02P 5/15* (2006.01)
- *F02B 37/18* (2006.01)

(52) U.S. Cl.
CPC ..... *G01M 15/102* (2013.01); *G01K 2013/024* (2013.01)

(56) References Cited

U.S. PATENT DOCUMENTS

| | | |
|---|---|---|
| 6,085,575 A | 7/2000 | Wienand et al. |
| 6,116,083 A | 9/2000 | Cullen et al. |
| 6,276,334 B1 | 8/2001 | Flynn et al. |
| 6,298,299 B1 | 10/2001 | Itoyama et al. |
| 6,508,242 B2 | 1/2003 | Jaliwala et al. |
| 6,732,522 B2 | 5/2004 | Wright et al. |
| 6,755,078 B2 | 6/2004 | Hernandez et al. |
| 7,313,918 B2 | 1/2008 | Melchior |
| 7,810,476 B2 | 10/2010 | Wang et al. |
| 2005/0021217 A1* | 1/2005 | Bhargava ............ F02D 41/0007 701/108 |

OTHER PUBLICATIONS

Kitanoski, Filip, Puntigam, Wolfgang, Kozek, Martin, Hager, Josef; "An Engine Heat Transfer Model for Comprehensive Thermal Simulations", SAE Technical Papers 2006-1-0882; 2006 SAE World Congress, Detroit, Michigan, Apr. 3-6, 2006; 11 Pages.

Eriksson, Lars; "Mean Value Models for Exhaust System Temperatures", SAE Technical Papers 2002-1-0374; SAE 2002 World Congress, Detroit, Michigan, Mar. 4-7, 2002; 17 Pages.

Fredriksson, Jonas, Egardt, Bo; "Estimating Exhaust Manifold Pressure in a Turbocharged Diesel Engine", Proceedings of the 2002 IEEE International Conference on Control Applications, Glasgow, Scotland, UK, Sep. 18-20, 2002; pp. 701-706.

Olin, Peter M.; "A Mean-Value Model for Estimating Exhaust Manifold Pressure in Production Engine Applications", SAE Technical Paper 2008-1-1004; 2008 World Congress, Detroit, Michigan; Apr. 14-17, 2008; 9 Pages.

\* cited by examiner

EXHAUST SYSTEM TEMPERATURE ESTIMATION SYSTEMS AND METHODS

CROSS-REFERENCE TO RELATED APPLICATIONS

This application is related to U.S. patent application Ser. No. 14/873,583 filed on Oct. 2, 2015. The disclosure of the above application is incorporated herein by reference in its entirety.

FIELD

The present disclosure relates to internal combustion engine systems and more particularly to systems and methods for estimating temperature within an exhaust system of a vehicle.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts a mixture of air and fuel to produce drive torque and propel a vehicle. Air is drawn into the engine through a throttle valve. Fuel provided by one or more fuel injectors mixes with the air to form the air/fuel mixture. The air/fuel mixture is combusted within one or more cylinders to produce drive torque. An engine control module (ECM) controls the torque output of the engine.

Exhaust gas resulting from combustion of the air/fuel mixture is expelled from the engine to an exhaust system. The ECM may adjust one or more engine parameters based on signals from various sensors that are located in the exhaust system. For example only, one or more temperature sensors and/or exhaust flow rate sensors may be located in the exhaust system. The ECM may adjust, for example, airflow into the engine, the amount of fuel injected, and/or spark timing based on the signals.

The sensors provide the ECM with measurements regarding conditions within the exhaust system and allow the ECM to adjust one or more engine parameters to create desired exhaust conditions. As the number of sensors implemented in the exhaust system increases, however, the cost of producing the vehicle also increases. The increased production cost may be attributable to, for example, the sensors themselves, associated wiring and hardware, and/or research and development. Additionally, a vehicle producer may produce a variety of different vehicles, and each of the different vehicles may have a different exhaust system. Calibrating and adjusting sensors implemented in each different vehicle and exhaust system may also increase vehicle production cost.

SUMMARY

In a feature, a control system for an engine of a vehicle is described. An adder module determines a temperature sum based on a sum of a plurality of temperatures determined based on (i) a plurality of operating parameters of the vehicle and (ii) a plurality of predetermined values calibrated for determining an estimated temperature at a location within an exhaust system of the vehicle. A temperature difference module determines a temperature difference based on the temperature sum and a previous value of the temperature difference. An estimating module determines the estimated temperature at the location within the exhaust system based on the temperature difference and a reference temperature. An actuator control module selectively adjusts at least one engine actuator based on the estimated temperature.

In further features, a first change module determines a first temperature change based on a difference between the temperature sum and the previous value of the temperature difference, and a second change module determines a second temperature change based on a product of the first temperature change and a gain value. The temperature difference module sets the temperature difference based on a sum of the previous value of the temperature difference and the second temperature change.

In further features, a gain module determines the gain value based on an engine coolant temperature.

In further features, the estimating module determines the estimated temperature at the location within the exhaust system based on a sum of the temperature difference and the reference temperature.

In further features, the plurality of operating parameters include at least two of: (i) a vehicle speed; (ii) a radiator fan speed; (iii) an engine speed; (iv) a manifold pressure; (v) an engine coolant temperature; (vi) a difference between the engine coolant temperature and an ambient air temperature; (vii) a spark timing of the engine; (viii) a mass air flowrate into the engine; (ix) a mass fuel flowrate to the engine; (x) a wastegate opening; (xi) a present air/fuel ratio of the engine; (xii) an intake air temperature; and (xiii) the ambient air temperature.

In further features, the plurality of operating parameters include: (i) a vehicle speed; (ii) a radiator fan speed; (iii) an engine speed; (iv) a manifold pressure; (v) an engine coolant temperature; (vi) a difference between the engine coolant temperature and an ambient air temperature; (vii) a spark timing of the engine; (viii) a mass air flowrate into the engine; (ix) a mass fuel flowrate to the engine; (x) a wastegate opening; (xi) a present air/fuel ratio of the engine; (xii) an intake air temperature; and (xiii) the ambient air temperature.

In further features, the plurality of operating conditions do not include any temperature measured in the exhaust system using a temperature sensor.

In further features, the plurality of operating conditions do not include any pressure measured in the exhaust system using a pressure sensor.

In further features: a second adder module determines a second temperature sum based on a sum of a second plurality of temperatures determined based on (i) the plurality of operating parameters of the vehicle and (ii) a second plurality of predetermined values calibrated for determining a second estimated temperature at a second location within the exhaust system of the vehicle; a second temperature difference module determines a second temperature difference based on the second temperature sum and a previous value of the second temperature difference; and a second estimating module determines the second estimated temperature at the second location within the exhaust system of the vehicle based on the second temperature difference and the reference temperature. The actuator control module further selectively adjusts at least one engine actuator based on the second estimated temperature.

In further features, based on the estimated temperature, the actuator control module selectively adjusts at least one of opening of a throttle valve, fueling of the engine, spark timing of the engine, cam phasing of the engine, opening of an exhaust gas recirculation (EGR) valve, and opening of a wastegate.

In a feature, a control method for an engine of a vehicle includes: determining a temperature sum based on a sum of a plurality of temperatures determined based on (i) a plurality of operating parameters of the vehicle and (ii) a plurality of predetermined values calibrated for determining an estimated temperature at a location within an exhaust system of the vehicle; determining a temperature difference based on the temperature sum and a previous value of the temperature difference; determining the estimated temperature at the location within the exhaust system based on the temperature difference and a reference temperature; and selectively adjusting at least one engine actuator based on the estimated temperature.

In further features, the control method further includes: determining a first temperature change based on a difference between the temperature sum and the previous value of the temperature difference; and determining a second temperature change based on a product of the first temperature change and a gain value, wherein determining the temperature difference includes setting the temperature difference based on a sum of the previous value of the temperature difference and the second temperature change.

In further features, the control method further includes determining the gain value based on an engine coolant temperature.

In further features, determining the estimated temperature includes determining the estimated temperature at the location within the exhaust system based on a sum of the temperature difference and the reference temperature.

In further features, the plurality of operating parameters include at least two of: (i) a vehicle speed; (ii) a radiator fan speed; (iii) an engine speed; (iv) a manifold pressure; (v) an engine coolant temperature; (vi) a difference between the engine coolant temperature and an ambient air temperature; (vii) a spark timing of the engine; (viii) a mass air flowrate into the engine; (ix) a mass fuel flowrate to the engine; (x) a wastegate opening; (xi) a present air/fuel ratio of the engine; (xii) an intake air temperature; and (xiii) the ambient air temperature.

In further features, the plurality of operating parameters include: (i) a vehicle speed; (ii) a radiator fan speed; (iii) an engine speed; (iv) a manifold pressure; (v) an engine coolant temperature; (vi) a difference between the engine coolant temperature and an ambient air temperature; (vii) a spark timing of the engine; (viii) a mass air flowrate into the engine; (ix) a mass fuel flowrate to the engine; (x) a wastegate opening; (xi) a present air/fuel ratio of the engine; (xii) an intake air temperature; and (xiii) the ambient air temperature.

In further features, the plurality of operating conditions do not include any temperature measured in the exhaust system using a temperature sensor.

In further features, the plurality of operating conditions do not include any pressure measured in the exhaust system using a pressure sensor.

In further features, the control method further includes: determining a second temperature sum based on a sum of a second plurality of temperatures determined based on (i) the plurality of operating parameters of the vehicle and (ii) a second plurality of predetermined values calibrated for determining a second estimated temperature at a second location within the exhaust system of the vehicle; determining a second temperature difference based on the second temperature sum and a previous value of the second temperature difference; determining the second estimated temperature at the second location within the exhaust system of the vehicle based on the second temperature difference and the reference temperature; and selectively adjusting at least one engine actuator based on the second estimated temperature.

In further features, adjusting at least one engine actuator includes adjusting at least one of opening of a throttle valve, fueling of the engine, spark timing of the engine, cam phasing of the engine, opening of an exhaust gas recirculation (EGR) valve, and opening of a wastegate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An exhaust system of a vehicle includes exhaust system components through which exhaust flows before the exhaust is expelled to atmosphere. Temperature and/or pressure sensors could be implemented to measure temperatures and/or pressures at various locations within the exhaust system. Temperature and pressure sensors, however, increase vehicle cost.

An estimation module according to the present application determines one or more estimated temperatures at one or more locations, respectively, within the exhaust system. The estimation module determines an estimated temperature at one location based on a sum of a plurality of temperature contributions determined based on (i) a plurality of operating parameters and (ii) a plurality of predetermined values calibrated for determining the estimated temperature.

The estimation module may also determine a second estimated temperature at a second location based on the same plurality of input parameters and second predetermined values calibrated for determining the second estimated temperature. The use of the same input parameters and temperature estimation strategy minimizes complexity and simplifies calibration as only the predetermined values would be calibrated in order to estimate different temperatures. Temperature and pressure sensors can also be omitted from the exhaust system, thereby minimizing the associated vehicle cost.

Figure 1:
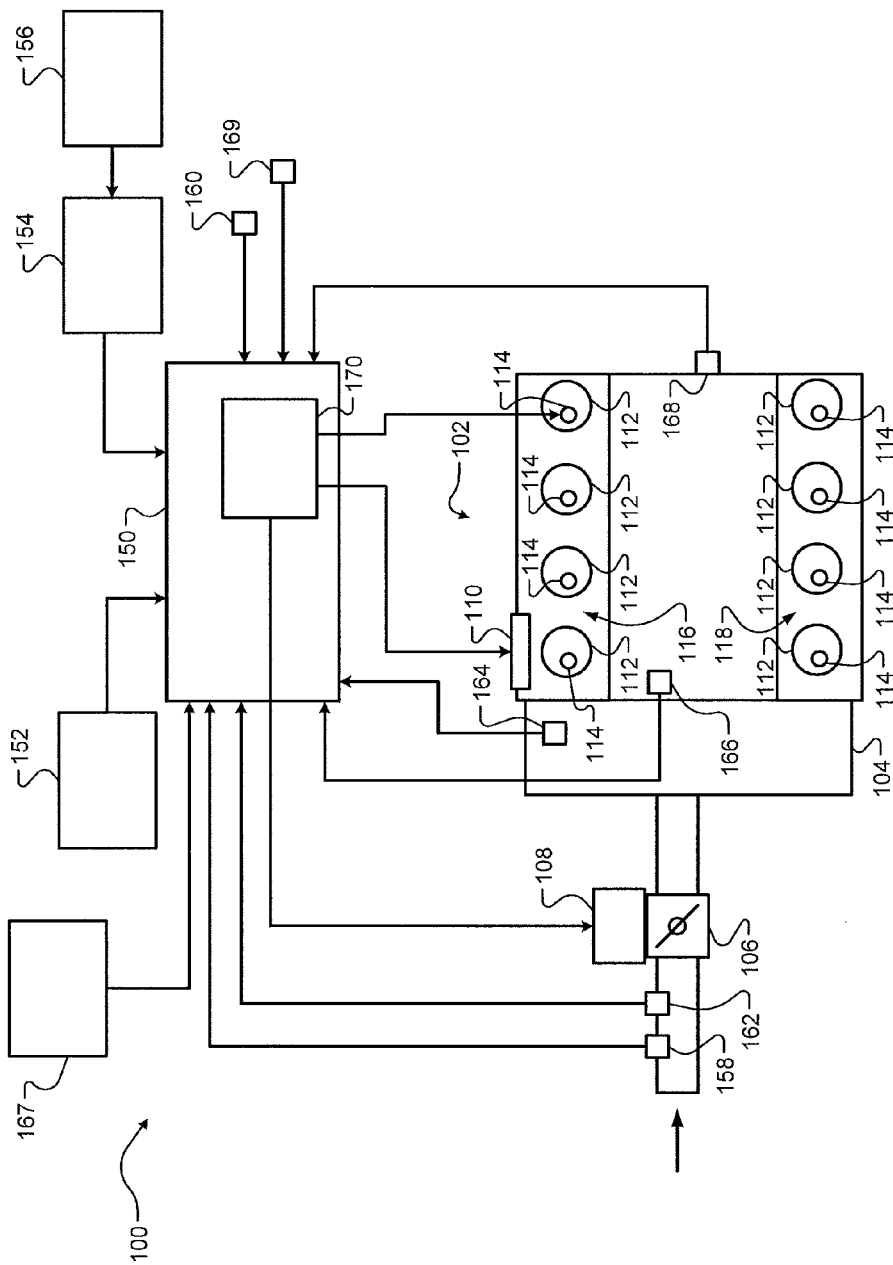
FIG. 1 is a functional block diagram of an example engine system.

Referring now to FIG. 1, a functional block diagram of an engine system 100 is presented. An air/fuel mixture is combusted within an engine 102 to produce drive torque for a vehicle. The engine 102 may be a gasoline-type engine, a diesel-type engine, a hybrid-type engine, and/or another suitable type of engine. The engine 102 may be configured in any suitable configuration. For example only, the engine 102 may be configured in a V-type configuration, a flat-type configuration, or an inline-type configuration.

Air is drawn into the engine 102 through an intake manifold 104 and a throttle valve 106. The throttle valve 106 is actuated to control airflow into the engine 102. A throttle actuator module 108, such as an electronic throttle controller, controls the throttle valve 106 and, therefore, airflow into the engine 102.

A fuel system 110 injects fuel that mixes with the air to form the air/fuel mixture. The fuel system 110 may provide fuel into the intake manifold 104, into intake valves (not shown) associated with cylinders 112 of the engine 102, and/or directly into each of the cylinders 112. In various implementations, the fuel system 110 includes one fuel injector (not shown) for each of the cylinders 112.

The air/fuel mixture is combusted within the cylinders 112 of the engine 102. Combustion of the air/fuel mixture may be initiated by, for example, spark provided by spark plugs 114. In some engine systems, such as the engine system 100, one spark plug may be provided for each of the cylinders 112. In other engine systems, such as diesel-type engine systems, combustion may be accomplished without the spark plugs 114. Combustion of the air/fuel mixture generates drive torque and rotatably drives a crankshaft (not shown).

The engine 102 may include eight cylinders as shown in FIG. 1, although the engine 102 may include a greater or fewer number of cylinders. The cylinders 112 of the engine 102 are depicted as being arranged in two cylinder banks: a left cylinder bank 116 and a right cylinder bank 118. While the engine 102 is shown as including the left and right cylinder banks 116 and 118, the engine 102 may include one cylinder bank or more than two cylinder banks. Inline-type engines may be considered to have cylinders arranged in one cylinder bank.

An engine control module (ECM) 150 controls the torque output of the engine 102. The ECM 150 may control the torque output of the engine 102 based on driver inputs provided by a driver input module 152. For example only, the driver inputs may include an accelerator pedal position, brake pedal position, cruise control input, and/or one or more other driver inputs.

The ECM 150 may communicate with a hybrid control module 154 to coordinate operation of the engine 102 and one or more electric motors, such as electric motor (EM) 156. The EM 156 may also function as a generator, and may be used to selectively produce electrical energy for use by vehicle electrical systems and/or for storage in a battery.

The ECM 150 makes control decisions based on parameters measured by various sensors. For example, intake air temperature may be measured using an intake air temperature (IAT) sensor 158. Ambient air temperature may be measured using a ambient temperature sensor 160. Mass flow rate of air into the engine 102 may be measured using a mass airflow (MAF) sensor 162. Pressure within the intake manifold 104 may be measured using a manifold absolute pressure (MAP) sensor 164. In various implementations, engine vacuum may be measured, where engine vacuum is determined based on the difference between ambient air pressure and the pressure within the intake manifold 104.

Engine coolant temperature (ECT) may be measured using a coolant temperature sensor 166. The coolant temperature sensor 166 may be located within the engine 102 or at other locations where the coolant is circulated, such as a radiator (not shown). Engine speed may be measured using an engine speed sensor 168. For example only, the engine speed may be measured based on the rotational speed of the crankshaft. Vehicle speed may be measured using a vehicle speed sensor 169. For example, the vehicle speed may be measured using one or more wheel speed sensors. One or more other sensors 167 may also be provided.

The ECM 150 includes an actuator control module 170 that controls engine operating parameters. For example only, the actuator control module 170 may adjust throttle opening, amount and/or timing of fuel injection, spark timing, cylinder deactivation, and/or turbocharger boost. The actuator control module 170 may also control other engine parameters, such as exhaust gas recirculation (EGR) valve opening, lift of intake and/or exhaust valves, and/or phasing of intake and/or exhaust valves.

Figure 2:
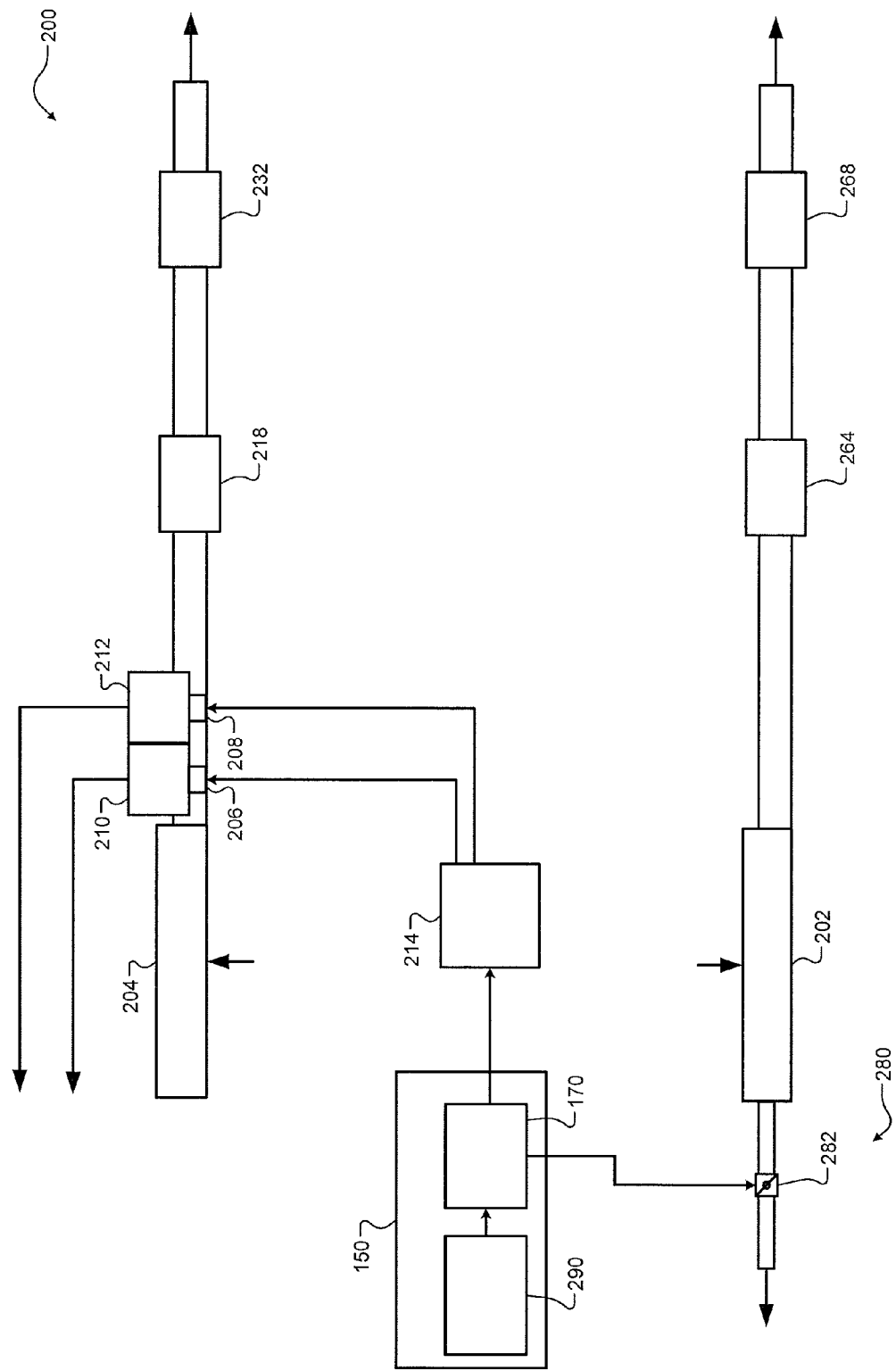
FIG. 2 is a functional block diagram of an example exhaust system.

Referring now to FIG. 2, a functional block diagram of an example exhaust system 200 is presented. The exhaust system 200 includes exhaust system components through which exhaust gas flows. While the exhaust system 200 is provided as an example, the present disclosure is also applicable to other exhaust system configurations including exhaust systems having different components and/or different arrangements of components.

Exhaust gas resulting from combustion of the air/fuel mixture is expelled from the engine 102 to the exhaust system 200. In the example of FIG. 2, exhaust is expelled from the cylinders 112 of the right cylinder bank 118 to a right exhaust manifold 202. Exhaust is expelled from the cylinders 112 of the left cylinder bank 116 to a left exhaust manifold 204. Exhaust expelled from cylinders arranged in one cylinder bank may be output to one exhaust manifold.

With respect to the left exhaust manifold 204, the exhaust may flow from the left exhaust manifold 204 past a first wastegate 206 and a second wastegate 208. The first and second wastegates 206 and 208 are associated with first and second turbochargers 210 and 212, respectively. In various implementations, one turbocharger and wastegate may be implemented.

The turbochargers 210 and 212 provide pressurized air to the engine 102, such as upstream of the throttle valve 106. The turbochargers 210 and 212 are driven by exhaust flow through the turbochargers 210 and 122. One or more intercoolers (not shown) may also be implemented to dissipate heat from the pressurized air. The temperature of the pressurized air may be increased by, for example, the pressurization of the air and/or via exhaust heat.

The wastegates 206 and 208 may allow the exhaust gas to bypass the turbochargers 210 and 212, respectively. In this manner, the wastegates 206 and 208 may be used to control the output (i.e., boost) of the turbochargers 210 and 212, respectively.

A boost actuator module 214 controls opening of the wastegates 206 and 208, and therefore output of the turbochargers 210 and 212, based on signals from the actuator control module 170. The boost actuator module 214 may control the positions of the wastegates 206 and 208 by controlling the duty cycle (DC) of power applied to the wastegates 206 and 208.

The exhaust from the left cylinder bank 116 may flow from the wastegates 206 and 208, to a first catalyst 218. The first catalyst 218 may include any suitable type of catalyst. For example only, the first catalyst 218 may include a diesel oxidation catalyst (DOC), a selective catalyst reductant (SCR) catalyst, a catalytic converter (e.g., three-way catalyst or a four-way catalyst), and/or any other exhaust catalyst. The first catalyst 218 may include one or more individual catalyst bricks.

The exhaust from the left cylinder bank 116 may flow from the first catalyst 218 to a first muffler 232. The first muffler 232 dampens acoustic noise produced by the cylinders 112 of the left cylinder bank 116.

The exhaust from the cylinders 112 of the right cylinder bank 118 flow from the right exhaust manifold 202 to a second catalyst 264. The second catalyst 264 may include any suitable type of catalyst. For example only, the second catalyst 264 may include a diesel oxidation catalyst (DOC), a selective catalyst reductant (SCR) catalyst, a catalytic converter (e.g., three-way catalyst or a four-way catalyst), and/or any other exhaust catalyst. The second catalyst 264 may include one or more individual catalyst bricks.

The exhaust from the right cylinder bank 118 may flow from the second catalyst 264 to a second muffler 268. The first muffler 268 dampens acoustic noise produced by the cylinders 112 of the right cylinder bank 118. In various implementations, the two exhaust streams may be joined, such as by a Y-pipe, an X-pipe, or an H-pipe. While both of the turbochargers are shown and described as being associated with the exhaust from the left cylinder bank 116, one turbocharger may be associated with each cylinder bank in various implementations.

An exhaust gas recirculation (EGR) system 280 may be associated with the left exhaust manifold 204 and/or the right exhaust manifold 202. For example only, the EGR system 280 may be associated with the right exhaust manifold 202, as shown in FIG. 2. An EGR valve 282 receives exhaust gas from the right exhaust manifold 202. When open, the EGR valve 282 redirects exhaust gas from the right exhaust manifold 202 back to the intake manifold 104. The actuator control module 170 controls actuation of the EGR valve 282 and, therefore, exhaust gas recirculation back to the engine 102. An EGR cooler (not shown) may also be implemented to cool recirculated exhaust gas before the recirculated exhaust gas is mixed with intake air. As stated above, the exhaust system 200 of FIG. 2 is provided as an example only, and the present disclosure is also applicable to exhaust systems having different components and/or different arrangements of components.

The ECM 150 includes an estimation module 290 that estimates one or more exhaust system temperatures. While the estimation module 290 and the actuator control module 170 are shown and discussed as being located within the ECM 150, the estimation module 290 and/or the actuator control module 170 may be located in any suitable location, such as external to the ECM 150. The estimation module 290 estimates the exhaust system temperature(s) using the same input parameters and model with predetermined values calibrated for the estimating each respective exhaust system temperature.

The actuator control module 170 selectively adjusts one or more engine operating parameters based on the one or more of the estimated exhaust system temperatures. In this manner, the actuator control module 170 may use one or more of the estimated exhaust system temperatures to create target exhaust system conditions. One or more of the estimated exhaust system temperatures may be used for one or more other reasons, such as fault diagnostics and other suitable uses.

Figure 3:
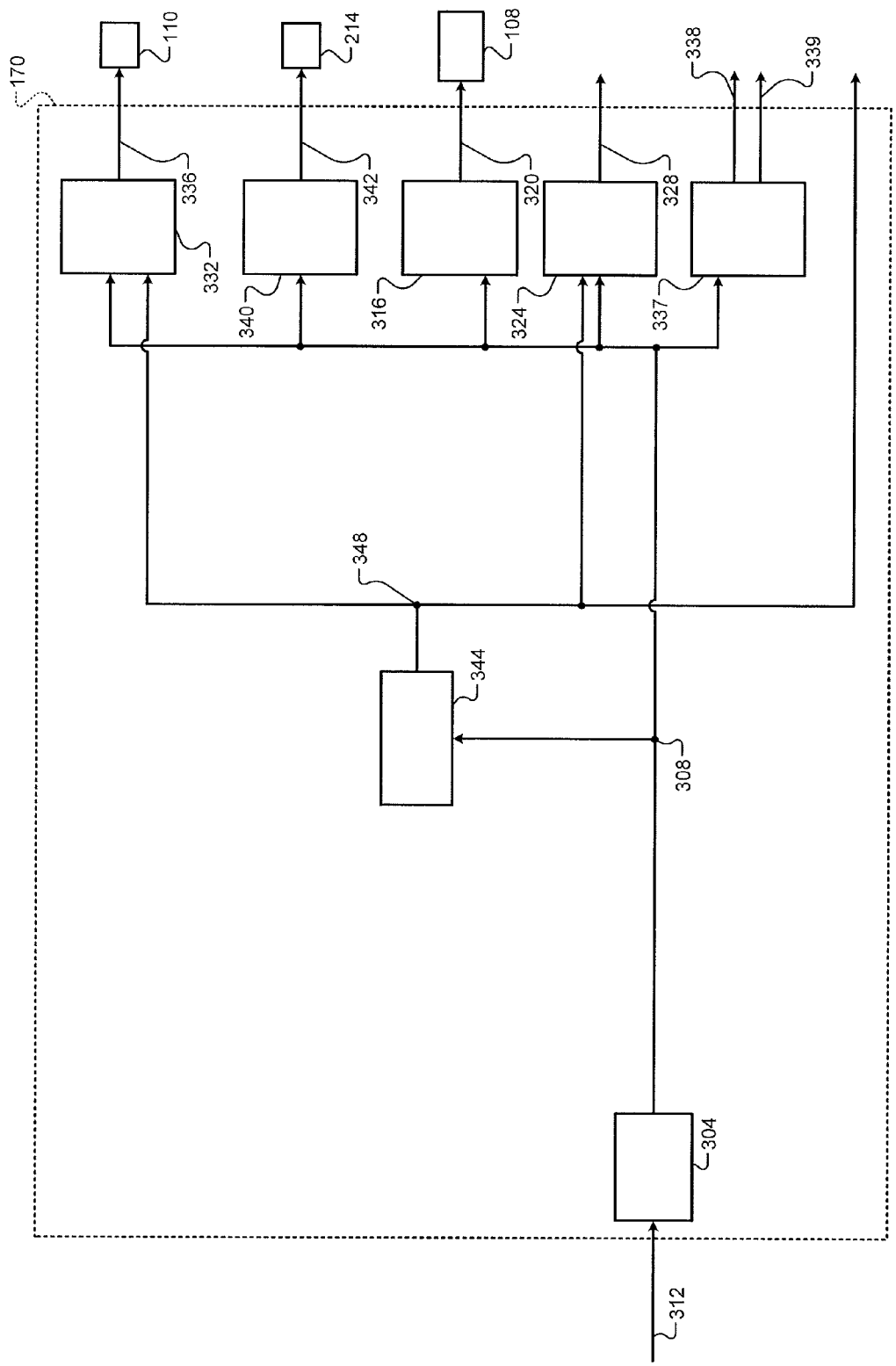
FIG. 3 is a functional block diagram of an example engine control system.

Referring now to FIG. 3, a functional block diagram of an example implementation of the actuator control module 170 is presented. A torque request module 304 determines a torque request 308 for the engine 102 based on one or more driver inputs 312. The driver inputs 312 may include, for example, an accelerator pedal position, a brake pedal position, a cruise control input, and/or one or more other suitable driver inputs. The torque request module 304 may determine the torque request 308 additionally or alternatively based on one or more other torque requests, such as torque requests generated by the ECM 150 and/or torque requests received from other modules of the vehicle, such as a transmission control module, the hybrid control module 154, a chassis control module, etc.

One or more engine actuators are controlled based on the torque request 308 and/or one or more other parameters. For example, a throttle control module 316 may determine a target throttle opening 320 based on the torque request 308. The throttle actuator module 108 may adjust opening of the throttle valve 106 based on the target throttle opening 320.

Generally speaking, a spark control module 324 determines a target spark timing 328 based on the torque request 308. The spark control module 324 generates spark based on the target spark timing 328. A fuel control module 332 determines one or more target fueling parameters 336 based on the torque request 308. For example, the target fueling parameters 336 may include fuel injection amount, number of fuel injections for injecting the amount, and injection timing. The fuel system 110 injects fuel based on the target fueling parameters 336.

A phaser control module 337 determines target intake and exhaust cam phaser angles 338 and 339 based on the torque request 308. A phaser actuator module may regulate intake and exhaust cam phasers (not shown) based on the target intake and exhaust cam phaser angles 338 and 339, respectively. A boost control module 340 may determine one or more target wastegate DCs, such as target wastegate DC 342, based on the torque request 308. The boost actuator module 214 may control a wastegate based on the target wastegate DC 342. A cylinder control module 344 generates a cylinder activation/deactivation command 348 based on the torque request 308.

A cylinder actuator module (not shown) deactivates the intake and exhaust valves of cylinders that are to be deactivated based on the cylinder activation/deactivation command 348. The cylinder actuator module allows opening and closing of the intake and exhaust valves of cylinders that are to be activated based on the activation/deactivation command 348. The fuel control module 332 halts fueling of cylinders that are to be deactivated.

Figure 4:
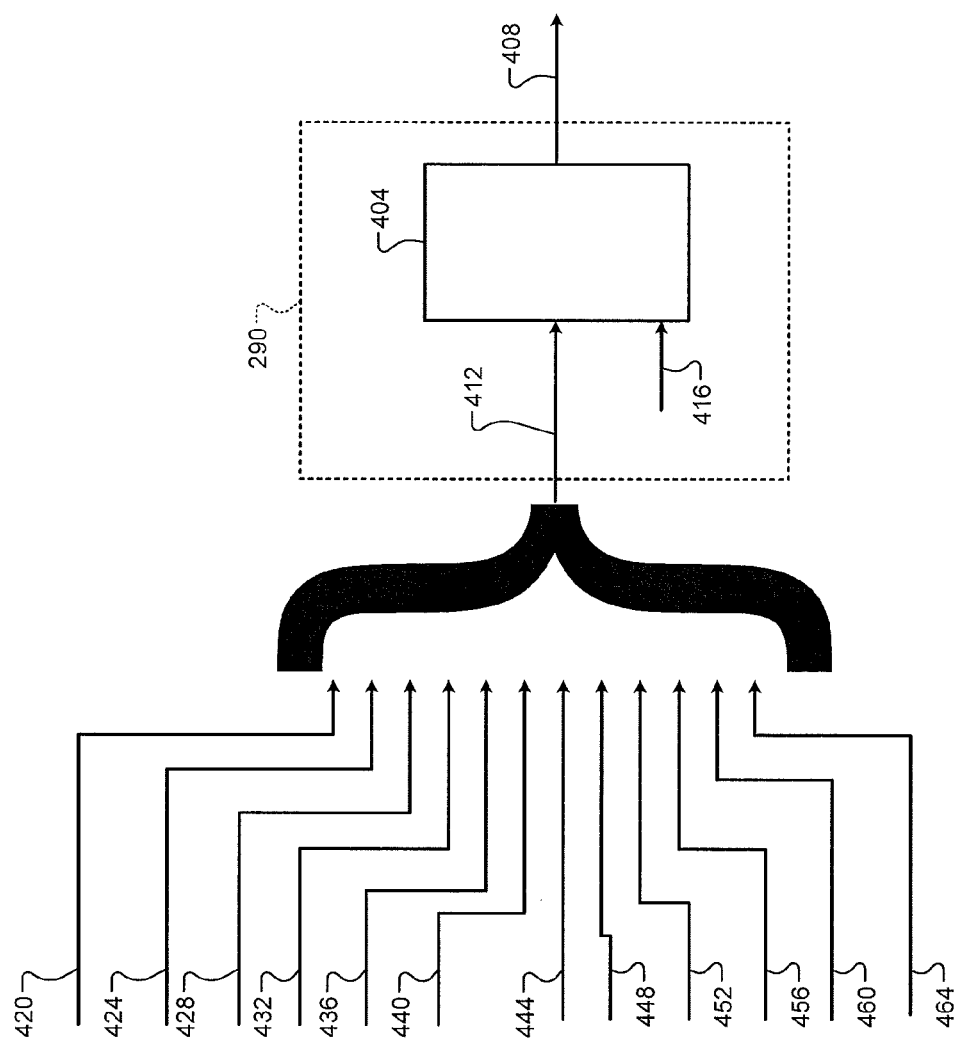
FIG. 4 is a functional block diagram of an example temperature estimation system.

Referring now to FIG. 4, a functional block diagram of an example implementation of the estimation module 290 is shown. The estimation module 290 includes a temperature estimation module 404 that determines an estimated temperature 408 at a location of an exhaust system. The estimated temperature 408 may be a temperature of an exhaust system component (e.g., metal or a catalyst) at the location or a temperature of exhaust gas at the location. Examples of the estimated temperature 408 include, but are not limited to, an estimated exhaust manifold temperature, an estimated exhaust temperature at an inlet of an exhaust catalyst, an estimated exhaust temperature at an outlet of a catalyst, an estimated temperature of a front portion of a catalyst, an estimated temperature of a rear portion of a catalyst, and an estimated temperature of a middle portion of a catalyst.

Sources of heat to the exhaust system include combustion within the engine, the engine block itself, and one or more exhaust catalyst(s). The temperature estimation module 404 determines the estimated temperature 408 based on a plurality of input parameters 412 and predetermined values 416 for determining the estimated temperature 408. The predetermined values 416 are calibrated for determining the estimated temperature 408 for possible combinations of the input parameters 412.

The input parameters 412 include engine coolant temperature (ECT) 420, ambient (air) temperature 424, intake air temperature (IAT) 428, vehicle speed (VS) 432, a radiator fan speed 436, and an engine speed (RPM) 440. The input parameters 412 also include a manifold pressure (e.g., MAP) 444, a spark timing 448, a mass air flowrate (MAF) 452 into the engine, a mass fuel (injection) flowrate (MFF) 456, a wastegate (WG) opening 460, and an air/fuel ratio 464 being supplied to the engine. In various implementations, the input parameters 412 do not include any measured temperatures within the exhaust system and/or do not include any measured pressures within the exhaust system.

The ECT 420 may be measured by an ECT sensor (e.g., the coolant temperature sensor 166), and the ambient temperature 424 may be measured by an ambient temperature sensor (e.g., the ambient temperature sensor 160). The IAT 428 may be measured using an IAT sensor (e.g., the IAT sensor 158), and the VS 432 may be measured using one or more sensors (e.g., the vehicle speed sensor 169). The radiator fan speed 436 may indicate whether a radiator fan is commanded on or off or, in the case of a variable speed radiator fan, indicate a commanded speed setting of the radiator fan. The RPM 440 may be measured using an engine speed sensor (e.g., the engine speed sensor 168), and the manifold pressure 444 may be measured using a manifold pressure sensor (e.g., the MAP sensor 164). The spark timing 448 may be, for example, the target spark timing 328. The MAF 452 may be measured using a MAF sensor (e.g., the MAF sensor 162), and the MFF 456 may be a target MFF provided by the fuel control module 332. The WG opening 460 may be, for example, the target WG DC 342. The air/fuel ratio 464 may be a target air/fuel ratio (e.g., a target equivalence ratio or EQR) for the engine.

Figure 5:
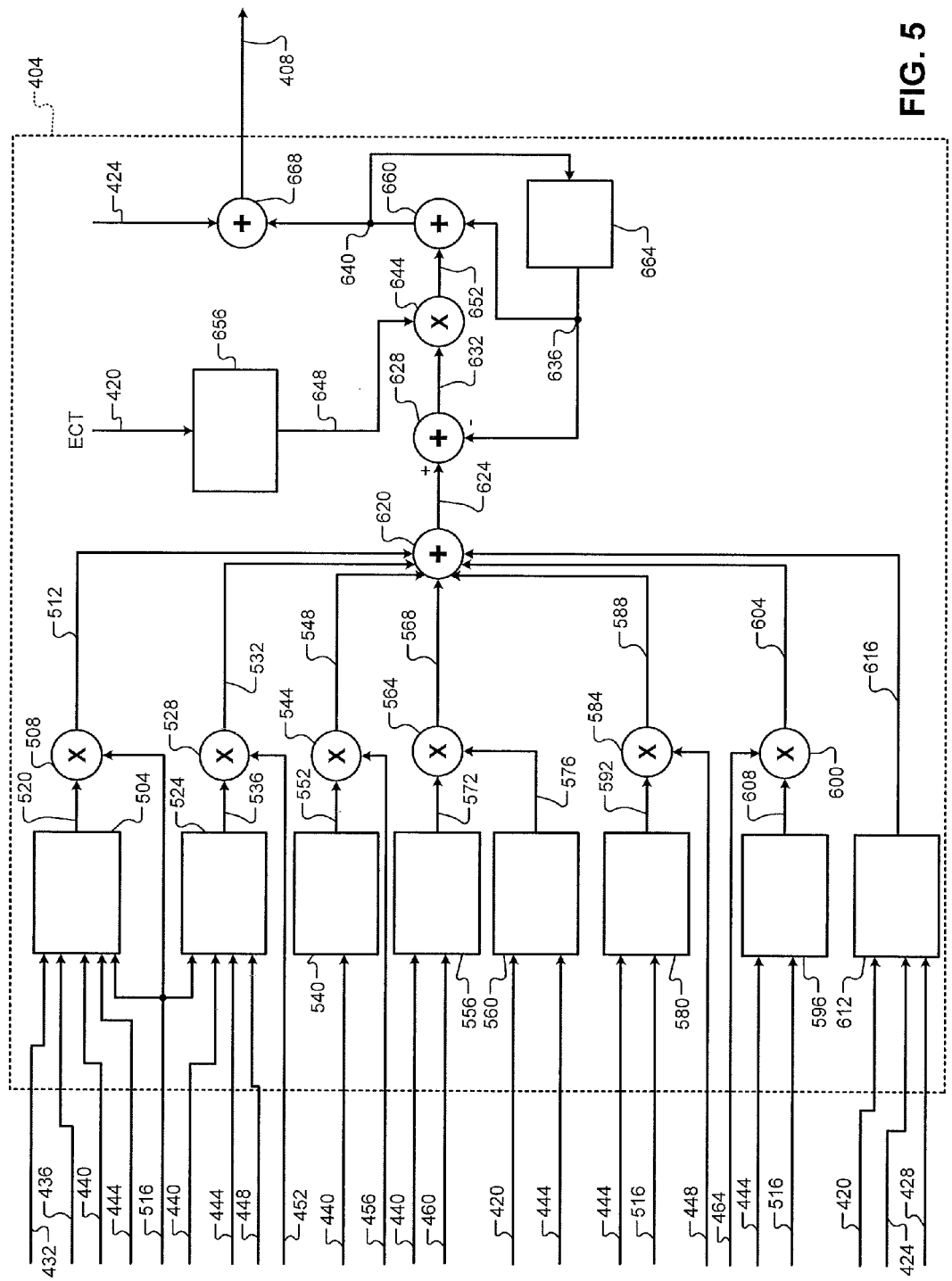
FIG. 5 is a functional block diagram of an example temperature estimation module.

Referring now to FIG. 5, a functional block diagram of an example implementation of the temperature estimation module 404 is presented. Generally speaking, the temperature estimation module 404 includes a plurality of modules that determine respective temperature contributions. The temperature contributions can be positive in the case of heat sources or negative in the case of heat sinks. The temperature estimation module 404 determines the estimated temperature 408 based on the temperature contributions, as discussed further below.

The temperature estimation module 404 may determine the estimated temperature 408 at a given time (n) based on the following equations:

$$\tilde{T}_e(n) = \tilde{T}_e(n-1) + \alpha(ECT)[u(n) - \tilde{T}_e(n-1)],$$

$$u(n) = g_c(VS(n), F(n), RPM(n), MAP(n), E\tilde{C}T(n))E\tilde{C}T(n) + g_a(RPM(n), MAP(n), S(n), E\tilde{C}T(n))MAF(n) + g_f(RPM(n))MFF(n) + g_e(RPM(n), WG(n)) f_e(MAP(n), E\tilde{C}T(n)) + g_s(MAP(n), E\tilde{C}T(n))S(n) + g_\omega(MAP(n), E\tilde{C}T(n))\phi(n)g_r(ECT(n), T_{amb}(n), IAT(n)),$$

$$E\tilde{C}T(n) = ECT(n) - T_{amb}(n), \text{ and}$$

$$T_e(n) = \tilde{T}_e(n) + T_{amb}(n)$$

$T_e$ is the estimated temperature 408, $\tilde{T}_e$ corresponds to how much warmer the estimated temperature 408 is than the ambient temperature $T_{amb}$ 424, ECT is the ECT 420, $E\tilde{C}T$ corresponds to a temperature difference between the ECT 420 and the ambient temperature $T_{amb}$ 424, IAT is the IAT 428, VS is the VS 432, F is the radiator fan speed 436, and MAF is the MAF 452. MFF is the MFF 456, RPM is the RPM 440, MAP is the manifold pressure 444, S is the spark timing 448, ø is the air/fuel ratio 464, and WG is the WG opening 460. $\alpha(\cdot)$, $g_c(\cdot)$, $g_a(\cdot)$, $g_f(\cdot)$, $g_e(\cdot)$, $f_e(\cdot)$, $g_s(\cdot)$, $g_\omega(\cdot)$, and $g_r(\cdot)$ denote functions using the predetermined values 416, and n is the time.

The term $g_c(\cdot)E\tilde{C}(n)$ corresponds to a heat contribution from the engine block through heat transfer. The terms, $g_a(\cdot)MAF(n)$, $g_f(\cdot)MFF(n)$, and $g_e(\cdot)f_e(n)$, correspond to the heat contributions from air, fuel and exhaust flows, respectively. The term $g_s(\cdot)S(n)$ corresponds to the combustion phasing impact, and the term $g_r(\cdot)$ represents a radiation heat sink. The term $\alpha(\cdot)$ reflects dynamic characteristics and is related to the system's time constant. As discussed further below, the term $\alpha(\cdot)$ is a function of the ECT 420.

A first component module 504 and a first multiplier module 508 generate a first temperature contribution 512 (e.g., in degrees K, C, or F) based on the VS 432, the radiator fan speed 436, the RPM 440, the MAP 444, and a temperature difference 516 between the ECT 420 and the ambient temperature 424. The first component module 504 generates a first temperature 520 as a function of the VS 432, the radiator fan speed 436, the RPM 440, the MAP 444, and the temperature difference 516 between the ECT 420 and the ambient temperature 424. The function may be, for example, a mapping or an equation including one or more of the predetermined values 416 that relates VS, radiator fan speeds, RPMs, MAPs, and temperature differences to first temperatures. The first multiplier module 508 multiplies the first temperature 520 with the temperature difference 516 to produce the first temperature contribution 512. The first temperature contribution 512 corresponds to heating (i.e., temperature increase relative to the ambient temperature 424) provided by the engine via heat transfer (e.g., conduction).

A second component module 524 and a second multiplier module 528 generate a second temperature contribution 532 (e.g., in degrees K, C, or F) based on the temperature difference 516 between the ECT 420 and the ambient temperature 424, the RPM 440, the MAP 444, the spark timing 448, and the MAF 452. The second component module 524 generates a second value 536 as a function of the temperature difference 516 between the ECT 420 and the ambient temperature 424, the RPM 440, the MAP 444, the spark timing 448. The function may be, for example, a mapping or an equation including one or more of the predetermined values 416 that relates temperature differences, RPMs MAPs, and spark timings to second values. The second multiplier module 528 multiplies the second value 536 with the MAF 452 to produce the second temperature contribution 532. The second temperature contribution 532 corresponds to heating (i.e., temperature increase relative to the ambient temperature 424) from air flow.

A third component module 540 and a third multiplier module 544 generate a third temperature contribution 548 (e.g., in degrees K, C, or F) based on the RPM 440 and the MFF 456. The third component module 540 generates a third value 552 as a function of the RPM 440. The function may be, for example, a mapping or an equation including one or more of the predetermined values 416 that relates RPMs to third values. The third multiplier module 544 multiplies the third value 552 with the MFF 456 to produce the third temperature contribution 548. The third temperature contribution 548 corresponds to heating (i.e., temperature increase relative to the ambient temperature 424) from fuel flow.

A fourth component module 556, a fifth component module 560, and a fourth multiplier module 564 generate a fourth temperature contribution 568 (e.g., in degrees K, C, or F) based on the RPM 440, the WG opening 460, the ECT 420, and the MAP 444. The fourth component module 556 generates a fourth value 572 as a function of the RPM 440 and the WG opening 460. The function may be, for example, a mapping or an equation including one or more of the predetermined values 416 that relates RPMs and WG openings to fourth values. The fifth component module 560 generates a fifth value 576 as a function of the ECT 420 and the MAP 444. The function may be, for example, a mapping or an equation including one or more of the predetermined values 416 that relates ECTs and MAPs to fifth values. The fourth multiplier module 564 multiplies the fourth value 572 with the fifth value 576 to produce the fourth temperature contribution 568. The fourth temperature contribution 568 corresponds to heating (i.e., temperature increase relative to the ambient temperature 424) from exhaust flow.

A sixth component module 580 and a fifth multiplier module 584 generate a fifth temperature contribution 588 (e.g., in degrees K, C, or F) based on the MAP 444, the temperature difference 516 between the ECT 420 and the ambient temperature 424, and the spark timing 448. The sixth component module 580 generates a sixth value 592 as a function of the MAP 444 and the temperature difference 516 between the ECT 420 and the ambient temperature 424. The function may be, for example, a mapping or an equation including one or more of the predetermined values 416 that relates MAPs and temperature differences to sixth values. The fifth multiplier module 584 multiplies the sixth value 592 with the spark timing 448 to produce the fifth temperature contribution 588. The spark timing 448 may be, for example, a value between 0.0 and 1.0 that is set based on the target spark timing 328 relative to a predetermined optimal spark timing for the present operating conditions. The fifth temperature contribution 588 corresponds to a combustion phasing (e.g., spark timing advance or retard) impact (i.e., temperature increase or decrease) on the estimated temperature 408.

A seventh component module 596 and a sixth multiplier module 600 generate a sixth temperature contribution 604 (e.g., in degrees K, C, or F) based on the MAP 444, the temperature difference 516 between the ECT 420 and the ambient temperature 424, and the air/fuel ratio 464 being supplied to the engine. The seventh component module 596 generates a seventh value 608 as a function of the MAP 444 and the temperature difference 516 between the ECT 420 and the ambient temperature 424. The function may be, for example, a mapping or an equation including one or more of the predetermined values 416 that relates MAPs and temperature differences to seventh values. The sixth multiplier module 600 multiplies the seventh value 608 with the air/fuel ratio 464 to produce the sixth temperature contribution 604. As stated above, the air/fuel ratio 464 may be expressed as an equivalence ratio value (e.g., target air/fuel ratio relative to a stoichiometric air/fuel ratio). The sixth temperature contribution 604 corresponds to heating (i.e., temperature increase relative to the ambient temperature 424) from the air/fuel mixture supplied to the engine.

An eighth component module 612 generates a seventh temperature contribution 616 (e.g., in degrees K, C, or F) based on the ECT 420, the ambient temperature 424, and the IAT 428. The eighth component module 612 generates the seventh temperature contribution 616 as a function of the ECT 420, the ambient temperature 424, and the IAT 428. The function may be, for example, a mapping or an equation including one or more of the predetermined values 416 that relates ECTs, ambient temperatures, and IATs to seventh temperature contributions. The seventh temperature contribution 616 corresponds to a radiation heat loss (i.e., temperature decrease toward the ambient temperature 424).

A first adder module 620 determines a temperature sum (u(n)) 624 (e.g., in degrees K, C, or F) by summing the first, second, third, fourth, fifth, sixth, and seventh temperature contributions 512, 532, 548, 568, 588, 604, and 616. A difference module 628 determines a first temperature change 632 (e.g., in degrees K, C, or F) by subtracting a previous temperature difference 636 (e.g., in degrees K, C, or F) from the temperature sum 624. The previous temperature difference 636 corresponds to a value of a temperature difference 640 from a last control loop, as discussed further below. A multiplier module 644 multiplies the first temperature change 632 by a gain value 648 to determine a second temperature change 652 (e.g., in degrees K, C, or F).

A gain module 656 determines the gain value 648 based on the ECT 420. For example the gain module 656 may determine the gain value 648 using a mapping or an equation including one or more of the predetermined values 416 that relates ECTs to gain values. The gain value 648 reflects dynamic characteristics of the system and is related to the system's time constant. While the example of the ECT 420 is used, the gain value may be determined based on one or more other measured parameters. The first, second, third, fourth, fifth, sixth, seventh, and eighth component modules 504, 524, 540, 556, 560, 580, 596, and 612, and the gain module 656 update their respective outputs once per predetermined period, such as a predetermined period of time or a predetermined amount of crankshaft rotation.

A temperature difference module 660 determines the temperature difference 640 by summing the second temperature change 652 with the previous temperature difference 636. The temperature difference 640 corresponds to how much warmer the estimated temperature 408 is than a reference temperature, such as the ambient temperature 424. A delay module 664 stores the temperature difference 640 for the predetermined period when the temperature difference 640 is updated and outputs the previous temperature difference 636. The delay module 664 may include or act as one-unit a first-in first-out (FIFO) buffer. The previous temperature difference 636 is the temperature difference 640 from the predetermined period earlier.

An estimating module 668 determines the estimated temperature 408 based on the temperature difference 640 and the ambient temperature 424. For example, the estimating module 668 may set the estimated temperature 408 equal to the sum of the temperature difference 640 and the ambient temperature 424. While the example of using the ambient temperature 424 as the reference temperature is provided, another suitable reference temperature may be used.

Figure 6:
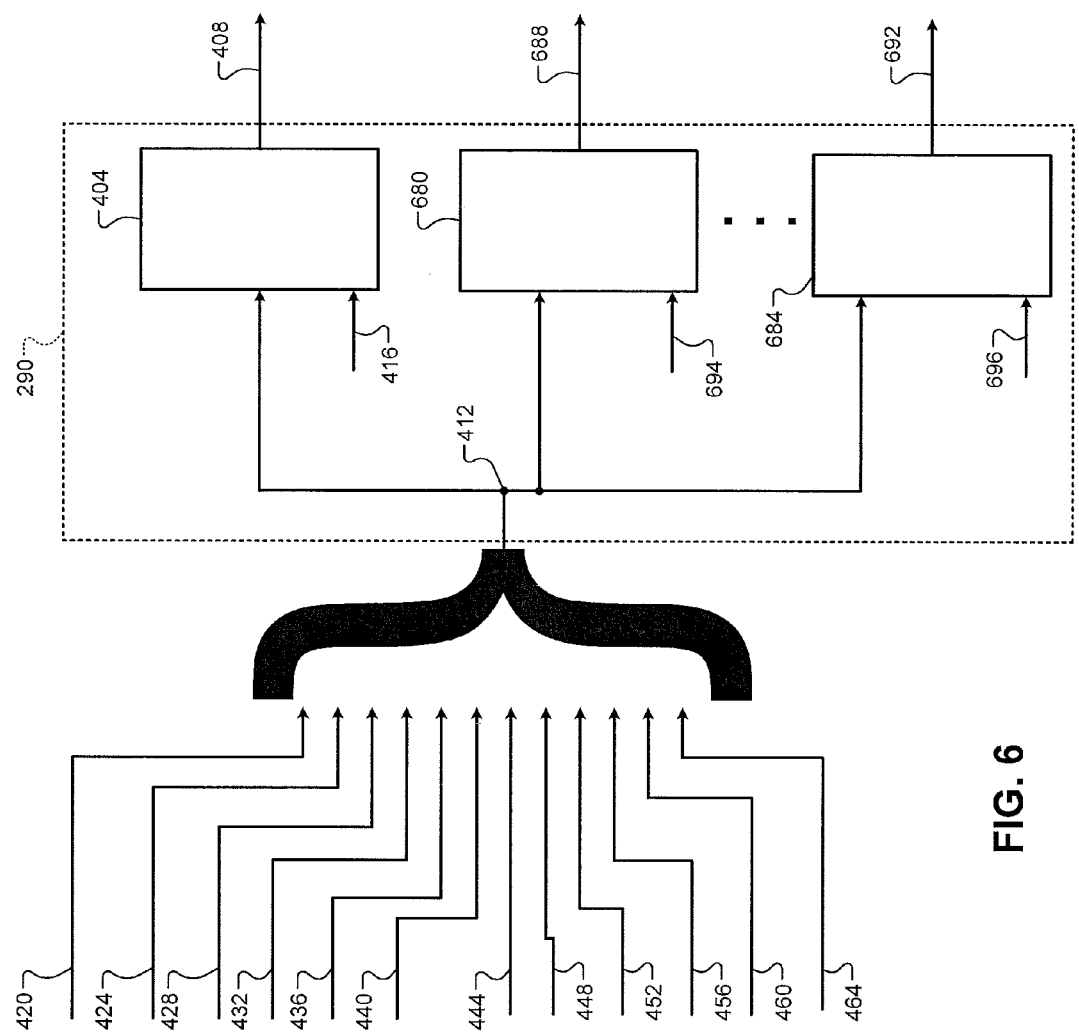
FIG. 6 is a functional block diagram of an example temperature estimation system.

FIG. 6 includes a functional block diagram of an example implementation of the estimation module 290 including the temperature estimation module 404 and one or more other temperature estimation modules, such as a second temperature estimation module 680 . . . and N-th temperature estimation module 684. Each other temperature estimation module determines a respective estimated temperature at a respective location in the exhaust system. For example, the second temperature estimation module 680 determines the second estimated temperature 688, and the N-th temperature estimation module 684 determines the N-th estimated temperature 692.

The other temperature estimation modules each include the modules of the temperature estimation module 404 shown and discussed with respect to FIG. 5. The other temperature estimation modules determine the respective estimated temperatures based on the input parameters 412 and predetermined values calibrated for determining the respective estimated temperatures. For example, the second temperature estimation module 680 determines the second estimated temperature 688 based on the input parameters 412 and second predetermined values 694 for determining the second estimated temperature 688. The N-th temperature estimation module 684 determines the N-th estimated temperature 692 based on the input parameters 412 and N-th predetermined values 696 for determining the N-th estimated temperature 692. The configuration of the temperature estimation module 404 therefore allows the same estimation strategy and input parameters to be used to estimate multiple different exhaust system temperatures. Only the respective predetermined values are calibrated for estimating different exhaust system temperatures.

Figure 7:
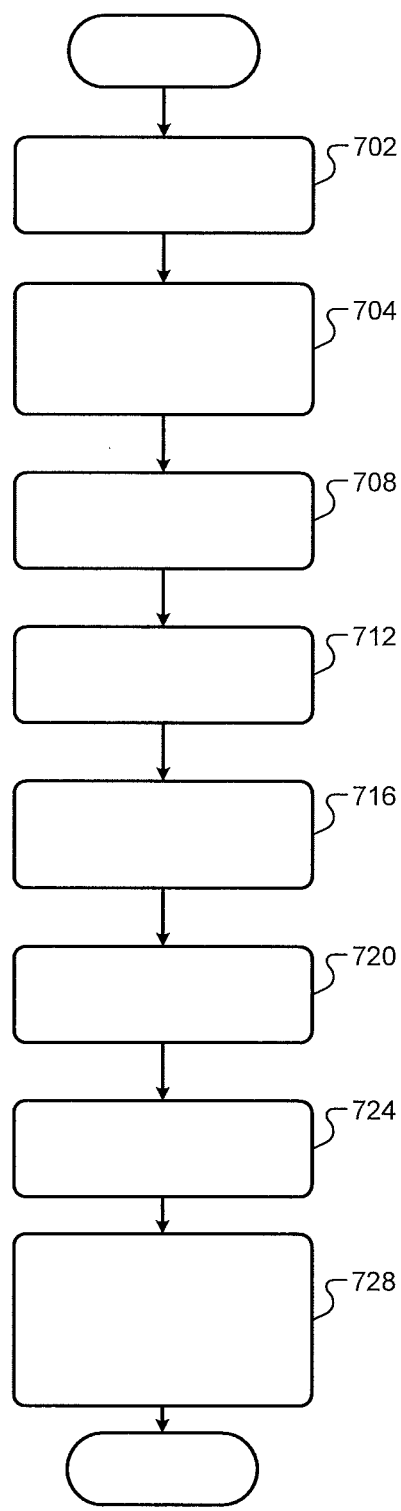
FIG. 7 is a flowchart depicting an example method of determining an estimated temperature within an exhaust system.

FIG. 7 is a flowchart depicting an example method of determining an estimated exhaust system temperature, such as the estimated temperature 408. The example of FIG. 7 is illustrative of one control loop, and a control loop may be initiated each predetermined period. Similar or identical functions may be performed concurrently to determine one or more other estimated temperatures.

Control may begin with 702 where the temperature estimation module 404 samples the input parameters 412. At 704, the first, second, third, fourth, fifth, sixth, and seventh temperature contributions 512, 532, 548, 568, 588, 604, and 616, respectively, are determined. As discussed above, the first component module 504 and the first multiplier module 508 generate the first temperature contribution 512 based on the VS 432, the radiator fan speed 436, the RPM 440, the MAP 444, and the temperature difference 516 between the ECT 420 and the ambient temperature 424. The second component module 524 and the second multiplier module 528 generate the second temperature contribution 532 based on the temperature difference 516 between the ECT 420 and the ambient temperature 424, the RPM 440, the MAP 444, the spark timing 448, and the MAF 452. The third component module 540 and the third multiplier module 544 generate the third temperature contribution 548 based on the RPM 440 and the MFF 456. The fourth component module 556, the fifth component module 560, and the fourth multiplier module 564 generate the fourth temperature contribution 568 based on the RPM 440, the WG opening 460, the ECT 420, and the MAP 444. The sixth component module 580 and the fifth multiplier module 584 generate the fifth temperature contribution 588 based on the MAP 444, the temperature difference 516 between the ECT 420 and the ambient temperature 424, and the spark timing 448. The seventh component module 596 and the sixth multiplier module 600 generate the sixth temperature contribution 604 based on the MAP 444, the temperature difference 516 between the ECT 420 and the ambient temperature 424, and the air/fuel ratio 464 being supplied to the engine. The eighth component module 612 generates the seventh temperature contribution 616 based on the ECT 420, the ambient temperature 424, and the IAT 428.

At 708, the first adder module 620 sums the first, second, third, fourth, fifth, sixth, and seventh temperature contributions 512, 532, 548, 568, 588, 604, and 616, respectively, to determine the temperature sum 624. At 712, the difference module 628 determines the first temperature change 632 by subtracting the previous temperature difference 636 from the temperature sum 624. More specifically, the difference module 628 sets the first temperature change 632 equal to or based on the temperature sum 624 minus the previous temperature difference 636.

The gain module 656 determines the gain value 648 based on the ECT 420 at 716. The multiplier module 644 also multiplies the first temperature change 632 by the gain value 648 to determine the second temperature change 652 at 716. At 720, the temperature difference module 660 determines the temperature difference 640 based on the second temperature change 652 and the previous temperature difference 636. For example, the temperature difference module 660 may set the temperature difference 640 based on or equal to the second temperature change plus the previous temperature difference 636.

At 724, the estimating module 668 determines the estimated temperature 408 based on the ambient temperature 424 and the temperature difference 640. For example, the estimating module 668 may set the estimated temperature 408 equal to or based on a sum of the ambient temperature 424 and the temperature difference 640. One or more engine operating parameters may be adjusted based on the estimated temperature 408. For example, the fuel control module 332, the boost control module 340, the throttle control module 316, the spark control module 324, and/or the phaser control module 337 may control fueling, boost of one or more boost devices, throttle opening, spark timing, and/or intake and/or exhaust cam phasing, respectively, based on the estimated temperature 408. At 728, the delay module 664 sets the previous temperature difference 636 equal to the temperature difference 640 for use during the next control loop.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A control system for an engine of a vehicle, comprising:
   an adder module that determines a temperature sum based on a sum of a plurality of temperatures determined based on (i) a plurality of operating parameters of the vehicle and (ii) a plurality of predetermined values calibrated for determining an estimated temperature at a location within an exhaust system of the vehicle;
   a temperature difference module that determines a temperature difference based on the temperature sum and a previous value of the temperature difference;
   an estimating module that determines the estimated temperature at the location within the exhaust system based on the temperature difference and a reference temperature; and
   an actuator control module that selectively adjusts at least one engine actuator based on the estimated temperature.

2. The control system of claim 1 further comprising:
   a first change module that determines a first temperature change based on a difference between the temperature sum and the previous value of the temperature difference; and
   a second change module that determines a second temperature change based on a product of the first temperature change and a gain value,
   wherein the temperature difference module sets the temperature difference based on a sum of the previous value of the temperature difference and the second temperature change.

3. The control system of claim 2 further comprising a gain module that determines the gain value based on an engine coolant temperature.

4. The control system of claim 1 wherein the estimating module determines the estimated temperature at the location within the exhaust system based on a sum of the temperature difference and the reference temperature.

5. The control system of claim 1 wherein the plurality of operating parameters include at least two of: (i) a vehicle speed; (ii) a radiator fan speed; (iii) an engine speed; (iv) a manifold pressure; (v) an engine coolant temperature; (vi) a difference between the engine coolant temperature and an ambient air temperature; (vii) a spark timing of the engine; (viii) a mass air flowrate into the engine; (ix) a mass fuel flowrate to the engine; (x) a wastegate opening; (xi) a present air/fuel ratio of the engine; (xii) an intake air temperature; and (xiii) the ambient air temperature.

6. The control system of claim 1 wherein the plurality of operating parameters include: (i) a vehicle speed; (ii) a radiator fan speed; (iii) an engine speed; (iv) a manifold pressure; (v) an engine coolant temperature; (vi) a difference between the engine coolant temperature and an ambient air temperature; (vii) a spark timing of the engine; (viii) a mass air flowrate into the engine; (ix) a mass fuel flowrate to the engine; (x) a wastegate opening; (xi) a present air/fuel ratio of the engine; (xii) an intake air temperature; and (xiii) the ambient air temperature.

7. The control system of claim 1 wherein the plurality of operating conditions do not include any temperature measured in the exhaust system using a temperature sensor.

8. The control system of claim 1 wherein the plurality of operating conditions do not include any pressure measured in the exhaust system using a pressure sensor.

9. The control system of claim 1 further comprising:
a second adder module that determines a second temperature sum based on a sum of a second plurality of temperatures determined based on (i) the plurality of operating parameters of the vehicle and (ii) a second plurality of predetermined values calibrated for determining a second estimated temperature at a second location within the exhaust system of the vehicle;
a second temperature difference module that determines a second temperature difference based on the second temperature sum and a previous value of the second temperature difference; and
a second estimating module that determines the second estimated temperature at the second location within the exhaust system of the vehicle based on the second temperature difference and the reference temperature,
wherein the actuator control module further selectively adjusts at least one engine actuator based on the second estimated temperature.

10. The control system of claim 1 wherein, based on the estimated temperature, the actuator control module selectively adjusts at least one of opening of a throttle valve, fueling of the engine, spark timing of the engine, cam phasing of the engine, opening of an exhaust gas recirculation (EGR) valve, and opening of a wastegate.

11. A control method for an engine of a vehicle, comprising:
determining a temperature sum based on a sum of a plurality of temperatures determined based on (i) a plurality of operating parameters of the vehicle and (ii) a plurality of predetermined values calibrated for determining an estimated temperature at a location within an exhaust system of the vehicle;
determining a temperature difference based on the temperature sum and a previous value of the temperature difference;
determining the estimated temperature at the location within the exhaust system based on the temperature difference and a reference temperature; and
selectively adjusting at least one engine actuator based on the estimated temperature.

12. The control method of claim 11 further comprising:
determining a first temperature change based on a difference between the temperature sum and the previous value of the temperature difference; and
determining a second temperature change based on a product of the first temperature change and a gain value,
wherein determining the temperature difference includes setting the temperature difference based on a sum of the previous value of the temperature difference and the second temperature change.

13. The control method of claim 12 further comprising determining the gain value based on an engine coolant temperature.

14. The control method of claim 11 wherein determining the estimated temperature includes determining the estimated temperature at the location within the exhaust system based on a sum of the temperature difference and the reference temperature.

15. The control method of claim 11 wherein the plurality of operating parameters include at least two of: (i) a vehicle speed; (ii) a radiator fan speed; (iii) an engine speed; (iv) a manifold pressure; (v) an engine coolant temperature; (vi) a difference between the engine coolant temperature and an ambient air temperature; (vii) a spark timing of the engine; (viii) a mass air flowrate into the engine; (ix) a mass fuel flowrate to the engine; (x) a wastegate opening; (xi) a present air/fuel ratio of the engine; (xii) an intake air temperature; and (xiii) the ambient air temperature.

16. The control method of claim 11 wherein the plurality of operating parameters include: (i) a vehicle speed; (ii) a radiator fan speed; (iii) an engine speed; (iv) a manifold pressure; (v) an engine coolant temperature; (vi) a difference between the engine coolant temperature and an ambient air temperature; (vii) a spark timing of the engine; (viii) a mass air flowrate into the engine; (ix) a mass fuel flowrate to the engine; (x) a wastegate opening; (xi) a present air/fuel ratio of the engine; (xii) an intake air temperature; and (xiii) the ambient air temperature.

17. The control method of claim 11 wherein the plurality of operating conditions do not include any temperature measured in the exhaust system using a temperature sensor.

18. The control method of claim 11 wherein the plurality of operating conditions do not include any pressure measured in the exhaust system using a pressure sensor.

19. The control method of claim 11 further comprising:
determining a second temperature sum based on a sum of a second plurality of temperatures determined based on (i) the plurality of operating parameters of the vehicle and (ii) a second plurality of predetermined values calibrated for determining a second estimated temperature at a second location within the exhaust system of the vehicle;
determining a second temperature difference based on the second temperature sum and a previous value of the second temperature difference;
determining the second estimated temperature at the second location within the exhaust system of the vehicle based on the second temperature difference and the reference temperature; and
selectively adjusting at least one engine actuator based on the second estimated temperature.

20. The control method of claim 11 wherein adjusting at least one engine actuator includes adjusting at least one of opening of a throttle valve, fueling of the engine, spark timing of the engine, cam phasing of the engine, opening of an exhaust gas recirculation (EGR) valve, and opening of a wastegate.

\* \* \* \* \*